US012283228B2

(12) United States Patent
Hu et al.

(10) Patent No.: US 12,283,228 B2
(45) Date of Patent: Apr. 22, 2025

(54) DISPLAY PANELS WITH STAGE TRANSMISSION SIGNAL LINES AND DISPLAY DEVICES HAVING THE SAME

(71) Applicant: WUHAN CHINA STAR OPTOELECTRONICS SEMICONDUCTOR DISPLAY TECHNOLOGY CO., LTD., Wuhan (CN)

(72) Inventors: Junyan Hu, Wuhan (CN); Chao Dai, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/265,285

(22) PCT Filed: Feb. 28, 2023

(86) PCT No.: PCT/CN2023/078659
§ 371 (c)(1),
(2) Date: Jun. 5, 2023

(87) PCT Pub. No.: WO2024/001256
PCT Pub. Date: Jan. 4, 2024

(65) Prior Publication Data
US 2024/0379046 A1 Nov. 14, 2024

(30) Foreign Application Priority Data
Jul. 1, 2022 (CN) ......................... 202210773967.8

(51) Int. Cl.
*G09G 3/32* (2016.01)

(52) U.S. Cl.
CPC ....... *G09G 3/32* (2013.01); *G09G 2310/0267* (2013.01)

(58) Field of Classification Search
CPC ........................ G09G 3/32; G09G 2310/0267; H01L 27/124; H01L 27/156; H10K 59/131
See application file for complete search history.

(56) References Cited

U.S. PATENT DOCUMENTS

2019/0279575 A1* 9/2019 Kim .................... G09G 3/3225

FOREIGN PATENT DOCUMENTS

CN 108182921 A 6/2018
CN 113096573 A 7/2021
(Continued)

OTHER PUBLICATIONS

PCT International Search Report for International Application No. PCT/CN2023/078659, mailed on Apr. 28, 2023, 7pp.
(Continued)

*Primary Examiner* — Stephen G Sherman
(74) *Attorney, Agent, or Firm* — The Roy Gross Law Firm, LLC; Roy D. Gross

(57) ABSTRACT

The present disclosure provides a display panel and a display device. The display panel includes a substrate, and a driving circuit layer disposed at a side of the substrate. The driving circuit layer includes multistage gate driving units disposed in a non-display area and stage transmission signal lines connecting the gate driving units of different stages. The driving circuit layer includes a first semiconductor layer disposed at the side of the substrate, the first semiconductor layer includes a plurality of first semiconductors disposed in non-display regions, and the gate driving units include the first semiconductors; and the stage transmission signal line is disposed between the first semiconductor layer and the
(Continued)

substrate, and is arranged to overlap with at least a portion of the gate driving unit in the non-display area.

14 Claims, 2 Drawing Sheets

(56) References Cited

FOREIGN PATENT DOCUMENTS

| | | | |
|---|---|---|---|
| CN | 113571021 | A | 10/2021 |
| CN | 114566505 | A | 5/2022 |
| CN | 115206997 | A | 10/2022 |

OTHER PUBLICATIONS

PCT Written Opinion of the International Searching Authority for International application No. PCT/CN2023/078659, mailed on Apr. 28, 2023, 8pp.

* cited by examiner (a)

(b)

DISPLAY PANELS WITH STAGE TRANSMISSION SIGNAL LINES AND DISPLAY DEVICES HAVING THE SAME

CROSS REFERENCE TO RELATED APPLICATIONS

This application is a National Phase of PCT Patent Application No. PCT/CN2023/078659 having international filing date of Feb. 28, 2023, which claims priority to and the benefit of Chinese Patent Application No. 202210773967.8 filed on Jul. 1, 2022. The contents of the above applications are all incorporated by reference as if fully set forth herein in their entirety.

TECHNICAL FIELD

The present disclosure relates to a technical field of display, and in particular to display panels and display devices.

BACKGROUND

In order to realize a narrow bezel of conventional display device, a gate driving circuit is used to control a pixel driving circuit. In the gate driving circuit, in order to realize signal transmission, the gate driving units of different stages are connected by a stage transmission signal line so that the signals may be transmitted. However, because the parasitic capacitance is larger due to the overlapping of the stage transmission signal line and other metals, the stage transmission signal line may not be arranged in the area corresponding to the gate driving unit, and a separate region needs to be provided for the stage transmission signal line, resulting in a larger bezel of the display panel.

Therefore, the conventional display device has a technical problem that it is necessary to provide a separate region for the stage transmission signal line, resulting in a larger bezel.

SUMMARY

Technical Problem

An embodiment of the present disclosure provides a display panel and a display device to alleviate a technical problem that a conventional display device needs to be provided with a separate region for a stage transmission signal line resulting in a larger bezel.

Technical Solution

To solve the above problem, the present disclosure provides the following technical solutions. An embodiment of the present disclosure provides a display panel including a display area and a non-display area disposed at at least one side of the display area; the display panel further includes: a substrate; a driving circuit layer disposed at a side of the substrate, the driving circuit layer including multistage gate driving units disposed in the non-display area and stage transmission signal lines connecting the gate driving units of different stages, the driving circuit layer includes a first semiconductor layer disposed at the side of the substrate, the first semiconductor layer includes a plurality of first semiconductors disposed in non-display regions, and the gate driving units comprise the first semiconductors; and the stage transmission signal line is disposed between the first semiconductor layer and the substrate, and is disposed to overlap with at least a portion of the gate driving unit in the non-display area.

In some embodiments, the driving circuit layer further includes a first metal layer disposed at a side of the first semiconductor layer away from the substrate, the first metal layer includes a gate disposed in the non-display region, and the gate driving unit comprises the gate; the stage transmission signal line is arranged to overlap with at least a portion of the gate in the non-display area.

In some embodiments, the driving circuit layer further includes a second metal layer disposed at a side of the first metal layer away from the substrate, the second metal layer includes a metal wire disposed in the non-display area, and the gate driving unit includes the metal wire; and the stage transmission signal line is arranged to overlap with at least a portion of the metal wire in the non-display area.

In some embodiments, the driving circuit layer further includes a source-drain layer disposed at a side of the second metal layer away from the first metal layer, the gate driving unit includes a transistor, the transistor includes a first electrode and a second electrode disposed in the source-drain layer, and the first electrode is connected to the stage transmission signal line through a first via hole.

In some embodiments, the first electrode is connected to the first semiconductor through a second via hole, a width of the first via hole is greater than a width of the second via hole.

In some embodiments, the driving circuit layer further includes a source-drain layer disposed at a side of the second metal layer away from the first metal layer, the gate driving unit includes a transistor, the transistor includes a first electrode and a second electrode disposed in the source-drain layer, the display panel further including a connection metal, the first electrode is connected to the stage transmission signal line through the connection metal, and the connection metal passes through a via hole and is connected to the stage transmission signal line.

In some embodiments, the display panel further includes a light emitting layer disposed at a side of the driving circuit layer away from the substrate, the light emitting layer includes a pixel light emitting unit disposed in the display area, the driving circuit layer further includes a pixel driving unit disposed in the display area and driving the pixel light emitting unit, and a light shielding layer disposed between the pixel driving unit and the substrate, the light shielding layer includes a light shielding portion and the stage transmission signal line disposed in the non-display area, and the light shielding portion is disposed in the display area and overlaps with the pixel driving unit.

In some embodiments, the first semiconductor layer further includes a plurality of second semiconductors disposed in the display area, and the pixel driving unit includes the second semiconductors; the first semiconductor includes a first channel region, and the stage transmission signal line does not overlap with the first channel region; and the second semiconductor includes a second channel region, and the light shielding portion is disposed to overlap with the second channel region.

In some embodiments, the driving circuit layer further includes a second semiconductor layer disposed at a side of the first semiconductor layer away from the substrate, the second semiconductor layer includes a plurality of third semiconductors disposed in the display area, the pixel driving unit further includes the third semiconductors, and the third semiconductors include a metal oxide material; and the light shielding portion does not overlap with the third semiconductors.

In some embodiments, the pixel driving unit includes: a first initialization transistor connected to a first initialization signal line, a gate of the first initialization transistor is connected to a first scanning signal line of a first gate driving unit, the first initialization transistor is configured to input a first initialization signal to a first node under control of a first scanning signal; a switching transistor configured to input a data signal to a second node under control of a second scanning signal; a driving transistor configured to drive the pixel light emitting unit to emit light under control of potentials of the first node and the second node; and a compensation transistor connected to the driving transistor through the first node and the third node, a gate of the compensation transistor is connected to a second scanning signal line of a second gate driving unit, the compensation transistor is configured to compensate a threshold voltage of the driving transistor under control of a third scanning signal; and the gate driving unit includes the first gate driving unit and the second gate driving unit of different stages, one end of the stage transmission signal line is connected to the first gate driving unit, and another end of the stage transmission signal line is connected to the second gate driving unit along the gate driving circuit region.

In some embodiments, the gate driving unit further includes a third gate driving unit, the gate driving circuit region includes a first wiring region and a second wiring region, the first gate driving unit and the second gate driving unit are disposed in the first wiring region, the third gate driving unit is disposed in the second wiring region, and at least a portion of the stage transmission signal line is disposed in the second wiring region.

In some embodiments, the first gate driving unit is connected to the stage transmission signal line through a via hole at a junction of the first wiring region and the second wiring region, and the second gate driving unit is connected to the stage transmission signal line through a via hole at the junction of the first wiring region and the second wiring region.

In some embodiments, the display panel further includes a connection wiring region disposed between the gate driving circuit region and the display area, the second wiring region is disposed between the first wiring region and the connection wiring region, and the stage transmission signal line extends from the second wiring region to the connection wiring region.

Meanwhile, an embodiment of the present disclosure provides a display device, the display device includes a display panel including a display area and a non-display area disposed at at least one side of the display area, and a driving chip; the display panel further includes: a substrate; and a driving circuit layer disposed at a side of the substrate, the driving circuit layer includes multistage gate driving units disposed in the non-display area and stage transmission signal lines connecting the gate driving units of different stages. The driving circuit layer includes a first semiconductor layer disposed at the side of the substrate, the first semiconductor layer includes a plurality of first semiconductors disposed in non-display regions, and the gate driving units include the first semiconductors; and the stage transmission signal line is disposed between the first semiconductor layer and the substrate, and is disposed to overlap with at least a portion of the gate driving unit in the non-display area.

In some embodiments, the driving circuit layer further includes a first metal layer disposed at a side of the first semiconductor layer away from the substrate, the first metal layer includes a gate disposed in the non-display region, and the gate driving unit includes the gate; and the stage transmission signal line is arranged to overlap with at least a portion of the gate in the non-display area.

In some embodiments, the driving circuit layer further includes a second metal layer disposed at a side of the first metal layer away from the substrate, the second metal layer includes a metal wire disposed in the non-display area, and the gate driving unit includes the metal wire; and the stage transmission signal line is arranged to overlap with at least a portion of the metal wire in the non-display area.

In some embodiments, the driving circuit layer further includes a source-drain layer disposed at a side of the second metal layer away from the first metal layer, the gate driving unit includes a transistor, the transistor includes a first electrode and a second electrode disposed in the source-drain layer, and the first electrode is connected to the stage transmission signal line through a first via hole.

In some embodiments, the first electrode is connected to the first semiconductor through a second via hole, a width of the first via hole is greater than a width of the second via hole.

In some embodiments, the driving circuit layer further includes a source-drain layer disposed at a side of the second metal layer away from the first metal layer, the gate driving unit includes a transistor, the transistor includes a first electrode and a second electrode disposed in the source-drain layer, the display panel further includes a connection metal, the first electrode is connected to the stage transmission signal line through the connection metal, and the connection metal passes through a via hole and is connected to the stage transmission signal line.

In some embodiments, the display panel further includes a light emitting layer disposed at a side of the driving circuit layer away from the substrate, the light emitting layer includes a pixel light emitting unit disposed in the display area. The driving circuit layer further includes a pixel driving unit disposed in the display area and driving the pixel light emitting unit, and a light shielding layer disposed between the pixel driving unit and the substrate. The light shielding layer includes a light shielding portion and the stage transmission signal line disposed in the non-display area, and the light shielding portion is disposed in the display area and overlaps with the pixel driving unit.

Beneficial Effect

The present disclosure provides a display panel and a display device. The display panel includes a display area and a non-display area disposed at at least one side of the display area, the display panel includes a substrate and a driving circuit layer disposed at a side of the substrate, the driving circuit layer includes multistage gate driving units disposed in the non-display area and a stage transmission signal line connecting gate driving units of different stages. The driving circuit layer includes a first semiconductor layer disposed at a side of the substrate, the first semiconductor layer includes a plurality of first semiconductors disposed in the non-display area, the gate driving unit includes a first semiconductor, and the stage transmission signal line is disposed between the first semiconductor layer and the substrate and is disposed to overlap with at least a portion of the gate driving unit in the non-display area. According to the present disclosure, by arranging the stage transmission signal line between the first semiconductor layer and the substrate, parasitic capacitance is prevented from being generated between the stage transmission signal line and the metal wires of the gate driving unit located above the first semiconductor layer, so that the stage transmission signal line may overlap with at least a part of the gate driving unit in the non-display area. In this way, a corresponding wiring area may be not additionally arranged for the stage transmission signal line, thereby reducing the space of the bezel occupied by the stage transmission signal line, and shortening the bezel of the display panel.

DETAILED DESCRIPTION

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

An embodiment of the present disclosure provides a display panel and a display device for alleviating the above-mentioned technical problem of a conventional display device in which a light emitting unit is provided on a gate driving circuit, which causes a low yield of the display device.

Figure 1:
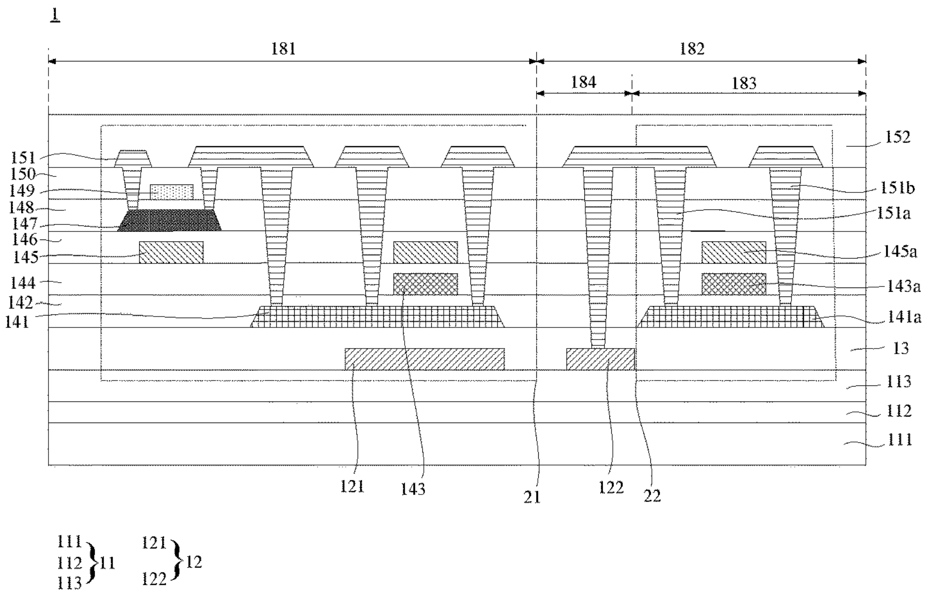
FIG. 1 is a first schematic diagram of a display panel according to an embodiment of the present disclosure.
Figure 2:
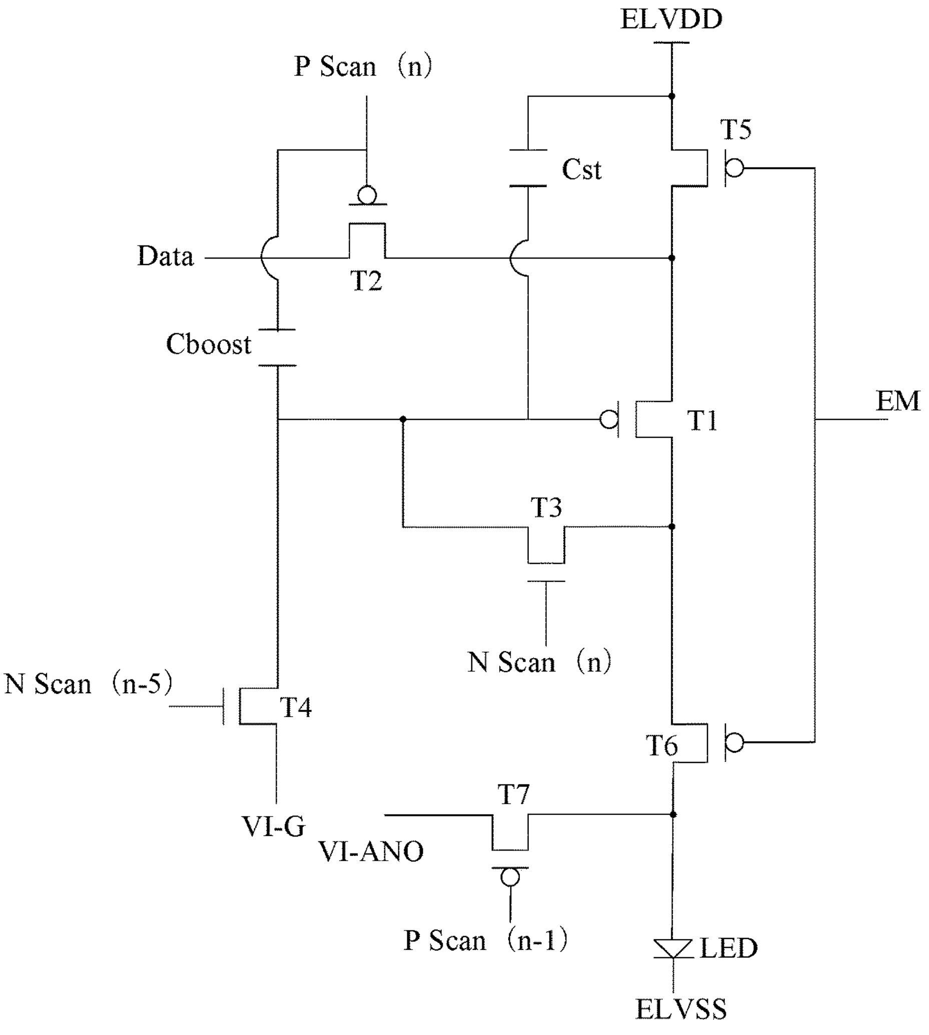
FIG. 2 is a circuit diagram of a display panel according to an embodiment of the present disclosure.
Figure 3:
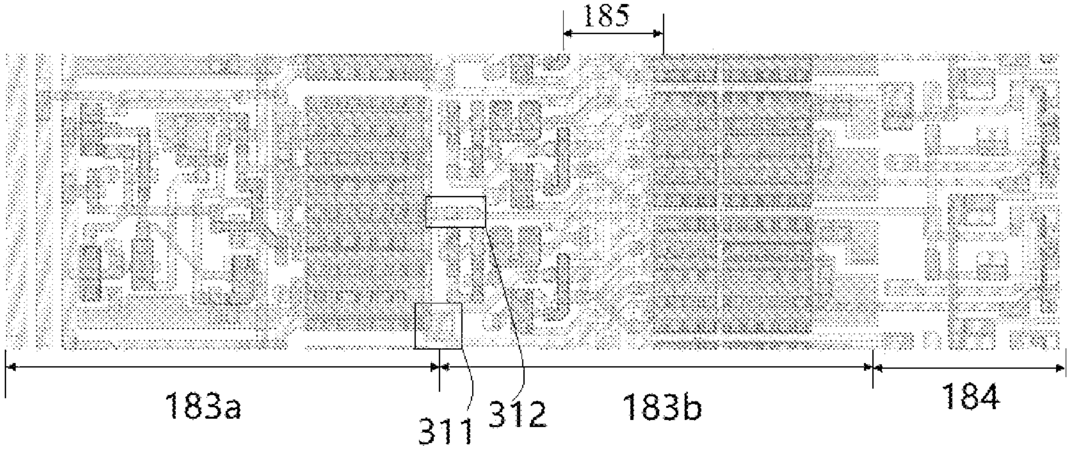
FIG. 3 is a perspective view of a display panel according to an embodiment of the present disclosure.

As shown in FIGS. 1 to 3, an embodiment of the present disclosure provides a display panel 1 including a display area 181 and a non-display area 182 disposed at at least one side of the display area 181. The display panel 1 further includes: a substrate 11; and a driving circuit layer disposed at one side of the substrate 11, the driving circuit layer includes multistage gate driving units 22 (one stage gate driving unit is shown in FIG. 3) provided in the non-display region 182, and stage transmission signal lines 122 connecting different stages of gate driving units 22. The driving circuit layer includes a first semiconductor layer 141 disposed at a side of the substrate 11, the first semiconductor layer 141 includes a plurality of first semiconductors 141*a* disposed on non-display regions, and the gate driving unit 22 includes the first semiconductors 141*a*. The stage transmission signal line 122 is disposed between the first semiconductor layer 141 and the substrate 11, and is disposed to overlap with at least a portion of the gate driving unit 22 in the non-display region 182.

An embodiment of the present disclosure provides a display panel which avoids generation of a parasitic capacitance between the stage transmission signal line and metal wirings of the gate driving unit located above the first semiconductor layer by arranging the stage transmission signal line between the first semiconductor layer and the substrate, so that the stage transmission signal line may be arranged to overlap with at least a part of the gate driving unit in the non-display region. In this way, there is no need to provide a corresponding wiring region for the stage transmission signal lines, thereby reducing a space of bezel occupied by the stage transmission signal lines, and shortening the bezel of the display panel.

It should be noted that FIG. 1 is a cross-sectional view of a display panel. Therefore, not all components of a single sub-pixel are shown in FIG. 1, and only some of transistors, wires, and capacitors are shown. Therefore, it may be understood that the pixel driving unit in FIG. 1 includes not only two transistors, but also other components. Similarly, the gate driving unit shown in FIG. 1 includes not only a single transistor but also other components, and specifically, the components included in the pixel driving unit may be a plurality of components shown in the circuit of FIG. 2.

It should be noted that the pixel light emitting unit is marked with an LED, but the present disclosure does not limit that the pixel light emitting unit is a light emitting diode, and the pixel light emitting unit may be an organic light emitting diode.

Specifically, as shown in FIG. 1, the first semiconductor layer 141 further includes a second semiconductor provided in the pixel driving unit 21, and the second semiconductor is not marked in FIG. 1.

In an embodiment, as shown in FIG. 1, the driving circuit layer further includes: a first metal layer 143 disposed on a side of the first semiconductor layer 141 away from the substrate 11, the first metal layer 143 includes a gate 143*a* disposed on the non-display region 182, and the gate driving unit 22 includes the gate 143*a*. The stage transmission signal line is arranged to overlap with at least a part of the gate in the non-display area, a region in which the gate is located may be reused for the stage transmission signal lines in the non-display region, so that an additional wiring region may be prevented from being provided for the stage transmission signal lines alone, and a corresponding bezel region may be shortened, thereby realizing a narrower bezel region. Meanwhile, the distance between the stage transmission signal line and the gate is larger, and the thickness of the insulating layer between the stage transmission signal line and the gate is larger, thereby avoiding the formation of the parasitic capacitance between the stage transmission signal line and the gate.

In an embodiment, as shown in FIG. 1, the driving circuit layer further includes: a second metal layer 145 disposed at a side of the first metal layer 143 away from the substrate 11, the second metal layer 145 includes a metal wire 145*a* disposed on the non-display area 182, and the gate driving unit 22 includes the metal wire 145*a*. The stage transmission signal line 122 is disposed to overlap with at least a portion of the metal wire 145*a* in the non-display area 182. Specifically, the metal wire 145*a* may include a first electrode plate of a capacitor in the gate driving unit and a wire in the same layer, while a second electrode plate of a capacitor in the first metal layer 143 is provided at a position corresponding to the first electrode plate, and the first electrode plate and the second electrode plate constitute a capacitor in the gate driving unit.

In the present embodiment, by arranging the stage transmission signal lines in an overlapping manner with at least a part of the metal wire in the non-display area a region where the metal wire is located may be reused for the stage transmission signal line in the non-display area, so that an additional wiring region may be prevented from being provided separately for the stage transmission signal line, and further, and a corresponding bezel region may be shortened, thereby realizing a narrower bezel region. Meanwhile, the distance between the stage transmission signal line and the metal wire is larger, and the thickness of the insulating layer between the stage transmission signal line and the metal wire is larger, thereby avoiding the formation of the parasitic capacitance between the stage transmission signal line and the metal wire.

In an embodiment, as shown in FIG. 1, the driving circuit layer further includes a source-drain layer 151 disposed at a side of the second metal layer 145 away from the first metal layer 143, the gate driving unit 22 includes a transistor including a first electrode 151*a* and a second electrode 151*b* disposed in the source-drain layer 151, and the first electrode 151*a* is connected to the stage transmission signal line 122 through a first via hole. In the present disclosure, transmit the signal of the stage transmission signal line may be transmitted by connecting the stage transmission signal line to the first electrode of the transistor, the stage transmission signal line occupies only the space with a width of the via hole in a connection wiring region, and the stage transmission signal line may be arranged in the gate driving circuit region, so that the space occupied by the stage transmission signal line is reduced, and the bezel of the display panel is reduced.

In an embodiment, the first electrode is a source, and the second electrode is a drain; or the first electrode is the drain, and the second electrode is the source.

In an embodiment, as shown in FIG. 1, the first electrode 151*a* is connected to the first semiconductor 141*a* through a second via hole, a width of the first via hole is greater than a width of the second via hole. By making the width of the first via hole larger than the width of the second via hole, when the first electrode is connected to the stage transmission signal line through the first via hole, because the aperture of the first via hole is larger, it is avoided that a portion of the first electrode breaks in the first via hole, which causes poor display.

Specifically, the light shielding layer is disposed below the first semiconductor layer, so that a depth of the first via hole is greater than a depth of the second via hole. Therefore, when the first electrode is connected to the stage transmission signal line in the light shielding layer through the via hole, the aperture of the first via hole may be made larger than the aperture of the second via hole, thereby preventing the first electrode from being broken when passing through the first via hole and causing poor signal transmission.

In an embodiment, the display panel further includes a buffer layer 13, a first insulating layer 142, a second insulating layer 144, a third insulating layer 146, a fourth insulating layer 148, a fifth insulating layer 150 and a third metal layer 149, the buffer layer 13 is disposed between a light shielding layer 12 and the first semiconductor layer 141, the first insulating layer 142 is disposed between the first semiconductor layer 141 and the first metal layer 143, the second insulating layer 144 is disposed between the first metal layer 143 and the second metal layer 145, the third insulating layer 146 is disposed between the second metal layer 145 and a second semiconductor layer 147, the fourth insulating layer 148 is disposed between the second semiconductor layer 147 and the third metal layer 149, and the fifth insulating layer 150 is disposed between the third metal layer 149 and the source-drain layer 151. The first via hole includes a portion located in the buffer layer, a portion located in the first insulating layer, a portion located in the second insulating layer, a portion located in the third insulating layer, a portion located in the fourth insulating layer, and a portion located in the fifth insulating layer, and projections of the portions of the first via hole respectively located in the buffer layer, the first insulating layer, the second insulating layer, the third insulating layer, the fourth insulating layer, and the fifth insulating layer on the substrate coincides with each other.

In an embodiment, the driving circuit layer further includes the source-drain layer disposed at a side of the second metal layer away from the first metal layer, the gate driving unit includes a transistor including the first electrode and the second electrode disposed in the source-drain layer, the display panel is formed with a connection metal, the first electrode is connected to the stage transmission signal line through the connection metal, and the connection metal passes through the via hole and is connected to the stage transmission signal line. By arranging the connection metal in the via hole and connecting the connection metal through the via hole to the stage transmission signal line, the first electrode may be connected to the stage transmission signal line through the connection metal, so that the first electrode is prevented from being broken in the via hole, and the connection effect of the first electrode and the connection metal is improved.

It should be noted that the above-described embodiments have described in detail the arrangement region of the stage transmission signal line and the connection mode of the stage transmission signal line, respectively. However, the arrangement region of the stage transmission signal line and the connection mode of the stage transmission signal line may be combined to achieve a better technical effect. For example, a first gate driving unit is connected to the stage transmission signal line through a via hole at the junction of the first wiring region and the second wiring region, a second gate driving unit is connected to the stage transmission signal line through a via hole at the junction of the first wiring region and the second wiring region, the stage transmission signal line is disposed in the light shielding layer, and an output end of the gate driving unit is connected to the stage transmission signal line through the via hole, so that the stage transmission signal line is disposed in the light shielding layer to avoid increasing the thickness of the display panel, the stage transmission signal line is connected to the first gate driving unit and the second gate driving unit through the via holes at the junction of the first wiring region and the second wiring region, which avoids occupying the bezel of the display panel, thereby narrowing the bezel of the display panel and not increasing the thickness of the display panel. Therefore, it is also possible to combine the other arrangement regions of the stage transmission signal lines and the other connection modes of the stage transmission signal lines to achieve a better effect, and details are not described herein.

In an embodiment, as shown in FIG. 1, the display panel further includes a light emitting layer disposed at a side of the driving circuit layer away from the substrate, and the light emitting layer includes a pixel light emitting unit disposed on the display area. The driving circuit layer further includes a pixel driving unit disposed in the display area and driving the pixel light emitting unit, and a light shielding layer 12 disposed between the pixel driving unit and the substrate. The light shielding layer 12 includes a light shielding portion 121 disposed in the display area and disposed to overlap with the pixel driving unit, and a stage transmission signal transmission line 122 disposed in the non-display area.

By arranging the stage transmission signal line in the light shielding layer 12, the stage transmission signal line 122 may be formed by the same process as the light shielding portion 121 in the display area, and the formation process of the light shielding portion 121 is reused, thereby reducing the difficulty of the formation process of the stage transmission signal line 122, saving the process flow, and reducing the production cost. Meanwhile, the stage transmission signal line may extend to the gate driving circuit region, the stage transmission signal line only occupies the space of the portion connected by the via hole, and the extended part of the stage transmission signal line may be arranged in the gate driving circuit region to reduce the space occupied by the stage transmission signal line. Since the thickness of the insulating layers between the light shielding layer and the first metal layer and the second metal layer is larger, the parasitic capacitance between the light shielding layer and the first metal layer and the second metal layer is smaller or even nonexistent, so that the parasitic capacitance of the display panel is prevented from being increased. Since the light shielding layer exists in the display panel, the metal film layer does not need to be added, the thickness of the display panel is reduced, and thus, compared with the stage transmission signal line formed by using other film layers, the thickness and the parasitic capacitance of the display panel are reduced.

In an embodiment, the first semiconductor layer further includes a plurality of second semiconductors disposed in the display area, the pixel driving unit includes the second semiconductor. The first semiconductor includes a first channel region, and the stage transmission signal line does not overlap with the first channel region. The second semiconductor includes a second channel region, and the light shielding portion is disposed to overlap with the second channel region.

In the present embodiment, the light shielding portion 121 and the second channel region of the second semiconductor are disposed to overlap with each other, so that the negative influence of the charge under the second channel region on the second channel region may be avoided, thereby enhancing the operation performance of the corresponding transistor in the pixel driving unit. At the same time, the stage transmission signal line 122 does not overlap with the first channel region of the first semiconductor, so that it is possible to prevent the stage transmission signal line from adversely affecting the transistor in the gate driving unit and from hindering its normal operation. In practical applications, the light shielding portion 121 may be grounded or connected to a constant potential, so as to shield the electric charge, however, the stage transmission signal line 122 may conduct a changing potential, which may cause an electric field that adversely affects the transistor, and thus it is necessary to arrange the stage transmission signal line 122 away from the first channel region of the first semiconductor.

In an embodiment, as shown in FIG. 1, the driving circuit layer further includes a second semiconductor layer 147 disposed at a side of the first semiconductor layer 141 away from the substrate, the second semiconductor layer 147 includes a plurality of third semiconductors disposed in the display area, the pixel driving unit further includes the third semiconductor, and the third semiconductor includes a metal oxide material (e.g., IGZO, full name "indium gallium zinc oxide", and the like). The light shielding portion and the third semiconductor are not overlapped.

In the present embodiment, the gate driving unit may be formed with transistors of different material types, for example, as shown in FIG. 2, the semiconductors of T1, T2, T5, T6, and T7 may be formed with low-temperature polysilicon, while the semiconductors of T3, T4 may be formed with metal oxides. As shown in FIG. 1, the semiconductor layers of the low-temperature polysilicon transistor and the metal oxide transistor are generally not arranged in the same layer, but have a stacked relationship between the first semiconductor layer and the second semiconductor layer. The light shielding portion is mainly provided for the low-temperature polysilicon transistor, for example, T1, and the metal oxide transistor may be provided in a double-gate structure (for example, 145 and 149 in FIG. 1) without using the light shielding portion to additionally shield the same.

In an embodiment, the display panel further includes a stage transmission metal layer disposed at a side of the light shielding layer away from the first semiconductor layer, and the stage transmission metal layer includes the stage transmission signal line. The stage transmission metal layer is formed into a stage transmission signal layer by providing the stage transmission metal layer at the side of the light shielding layer away from the first semiconductor layer, such that the stage transmission signal line is disposed in a gate driving circuit region, reducing a bezel of the display panel.

In an embodiment, as shown in FIGS. 1 and 2, the pixel driving unit 21 includes: a first initialization transistor T4 connected to a first initialization signal line VI-G, a gate of the first initialization transistor T4 is connected to a first scanning signal line N Scan (n−5) of the first gate driving unit, the first initialization transistor T4 is used for inputting a first initialization signal to a first node under the control of the first scanning signal; a switching transistor T2 for inputting a data signal to a second node under the control of the second scanning signal; a driving transistor T1 for driving the pixel light emitting unit LED to emit light under the control of potentials of the first node and the second node; a compensation transistor T3 connected to the driving transistor T1 through the first node and a third node, a gate of the compensation transistor T3 is connected to a second scanning signal line N Scan (n) of a second gate driving unit, the compensation transistor T3 is used for compensating a threshold voltage of the driving transistor T1 under the control of a third scanning signal. The gate driving unit 22 includes the first gate driving unit and the second gate driving unit of different stages, one end of the stage transmission signal line 122 is connected to the first gate driving unit, and another end of the stage transmission signal line 122 is connected to the second gate driving unit along the gate driving circuit region 183.

By connecting the first initialization transistor and the compensation transistor to the first scanning signal line and the second scanning signal line of the first gate driving unit and the second gate driving unit, respectively, the first initialization transistor and the compensation transistor may be turned on at different stages, thereby resetting and compensating the threshold voltage of the driving transistor, respectively, and avoiding signal crosstalk caused by turning on the first initialization transistor and the compensation transistor at the same time. The driving time of the first initialization transistor and the compensation transistor are separated by adding a 5 stages of gate driving units, so that the added 5 stages of gate driving units may turn on the first initialization transistors in previous 10 rows of pixel driving units, for example, the sixth stage gate driving unit drives the compensation transistor in the pixel driving units in the first and second rows, and simultaneously drives the first initialization transistors in the eleventh and twelfth row pixel driving units, whereby the first initialization transistor and the compensation transistor may be separately driven.

Therefore, it is necessary for the first gate driving unit and the second gate driving unit to use the stage transmission signal line to perform the stage transmission of signal. Compared with the case in which the third metal layer is currently used to form the stage transmission signal line, the third metal layer cannot overlap the first metal layer and the second metal layer, and thus the stage transmission signal line occupies a large space and the bezel is increased in size, according to the present disclosure, the first gate driving unit and the second gate driving unit are connected to the stage transmission signal line in the gate driving circuit region, so that the space occupied by the stage transmission signal line is avoided, and the bezel of the display panel is reduced.

In an embodiment, the first initialization transistor and the compensation transistor are oxide semiconductor transistors.

In an embodiment, as shown in FIGS. 2 and 3, the gate driving unit further includes a third gate driving unit, the gate driving circuit region includes a first wiring region 183*a* and a second wiring region 183*b*, the first gate driving unit and the second gate driving unit are disposed in the first wiring region 183*a*, the third gate driving unit is disposed in the second wiring region, and at least a portion of the stage transmission signal line is disposed in the second wiring region 183*b*. According to the present disclosure, at least a portion of the stage transmission signal line is arranged in the second wiring region, so that signal crosstalk occurs when the stage transmission signal lines are connected to the first gate driving unit and the second gate driving unit. At the same time, the stage transmission signal lines are arranged in the second wiring region, so that space occupied by the stage transmission signal lines may be avoided, and the width of the bezel of the display panel may be reduced.

Specifically, as shown in FIG. 2, it can be seen that the gate driving unit controls the transistors by using the scanning signal line P Scan (n) for controlling the P-type transistor and the scanning signal line N Scan (n) for controlling the N-type transistor, respectively. Therefore, it is necessary to provide the gate driving unit corresponding to the scanning signal line N Scan (n) and the gate driving unit corresponding to the scanning signal line P Scan (n) in the first wiring region and the second wiring region, respectively. As shown in FIG. 3, FIG. 3 shows a gate driving unit corresponding to the scanning signal line N Scan (n) and a gate driving unit corresponding to the scanning signal line P Scan (n) in a certain stage gate driving unit, and the arrangement of wires connected to the display area. In the embodiment of the present disclosure, the stage transmission signal line is arranged in the second wiring region 183*b*, that is, the stage transmission signal line arrangement region 185 in FIG. 3 is located in the second wiring region 183*b*, so that the bezel occupied by the stage transmission signal line is reduced, and the bezel of the display panel is reduced.

In an embodiment, the first gate driving unit is connected to the stage transmission signal line through a via hole at the junction of the first wiring region and the second wiring region, and the second gate driving unit is connected to the stage transmission signal line through a via hole at the junction of the first wiring region and the second wiring region. By connecting the first gate driving unit and the second gate driving unit to the stage transmission signal line through the via holes at the junction of the first wiring region and the second wiring region, signal transmission may be performed through the stage transmission signal line, and the connection between the stage transmission signal line and the gate driving unit is located in the gate driving circuit region, so that the space occupied by the stage transmission signal line is avoided, and the gate driving unit does not need to be extended, so that crosstalk caused by overlapping or short circuit of the metal layers in the gate driving unit is avoided.

As can be seen from FIG. 3, the gate driving unit corresponding to N Scan (n) is connected to the stage transmission signal line at the first connection position 311, so that the upper gate driving unit may transmit signals to the lower gate driving unit through the stage transmission signal line, and at the same time, the gate driving unit corresponding to N Scan (n) is connected to the transistor in the pixel driving unit in the display area through the second connection position 312, thereby driving the transistor. Since the gate driving unit and the stage transmission signal line are connected at the junction of the first wiring region and the second wiring region, a signal interference between the gate driving unit corresponding to N Scan (n) and the gate driving unit corresponding to P Scan (n) or defects due to metal overlapping and short circuit are avoided.

In an embodiment, as shown in FIGS. 1 and 3, the display panel 1 further includes a connection wiring region 184 disposed between the gate driving circuit region 183 and the display region 181, the second wiring region 183*b* disposed between the first wiring region 183*a* and the connection wiring region 184, and the stage transmission signal line 122 extends from the second wiring region 183*b* to the connection wiring region 184. According to the present disclosure, the stage transmission signal line is extended from the second wiring region to the connection wiring region, so that the stage transmission signal line may be connected with the signal line to realize signal transmission. The stage transmission signal line only needs to occupy a part of the connection wiring region at the connection position, thereby reducing the occupied space of the stage transmission signal line and reducing the bezel of the display panel.

In an embodiment, as shown in FIG. 2, the pixel driving unit further includes: a second initialization transistor T7, the second initialization transistor T7 is connected to a second initialization signal line VI-ANO for inputting a second initialization signal to the anode of the light emitting device LED under the control of a fourth scanning signal; a first light emitting control transistor T5 connected to the driving transistor T1 through the second node and used for turning on the current from the power supply high-potential signal line ELVDD to the driving transistor T1 under the control of the light emitting control signal; and a second light emitting control transistor T6 connected to the driving transistor T1 through the third node, and used for turning on the current flowing from the driving transistor T1 to the anode of the light emitting device LED under the control of the light emitting control signal.

In an embodiment, as shown in FIG. 2, the pixel driving unit further includes a storage capacitor Cst and a boost capacitor Cboost, one end of the storage capacitor Cst is connected to the power supply high-potential signal line VDD, another end of the storage capacitor Cst is connected to the first node, one end of the boost capacitor is connected to the first initialization transistor T4, and another end of the boost capacitor is connected to the gate of the switching transistor T2.

It may be appreciated that in the present embodiment, as shown in FIG. 2, the data line Data transmits the data signal, the first initialization signal line VI-G transmits the first initialization signal, the second initialization signal line VI-ANO transmits the second initialization signal, the first scanning signal line N Scan (n−5) transmits the first scanning signal, the second scanning signal line N Scan (n) transmits a second scanning signal, the third scanning signal line P Scan (n) transmits the third scanning signal, the fourth scanning signal line P Scan (n−1) transmits the fourth scanning signal, the light emitting control signal line EM transmits a light emitting control signal, and the power supply low-potential signal line ELVSS transmits a low potential.

P Scan (n) denotes the current stage scanning line, P Scan (n−1) denotes the previous stage scanning line, and the scanning lines described above are used to control the P-type transistor.

The circuit operates as follows: in the first phase, the first initialization transistor T4 and the second initialization transistor T7 are turned on, the gate of the driving transistor T1 is reset by the initialization signal output from the first initialization signal line VI-G, and the pixel light emitting unit LED is reset by the initialization signal output from the second initialization signal line VI-ANO; in the second phase, the switching transistor T2 and the compensation transistor T3 are turned on, and the data signal input from the data line Data is written to the gate of the driving transistor T1; in the third phase, the first light emitting control transistor T5 and the second light emitting control transistor T6 are turned on to drive the pixel light emitting unit LED to emit light.

Figure 4:
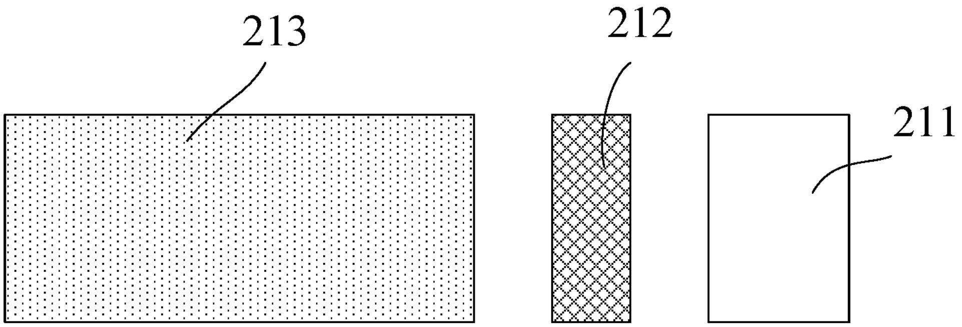
FIG. 4 is a comparison diagram of arrangement regions of various components of a conventional display device and a display panel of the present disclosure according to an embodiment of the present disclosure.
Figure 4:
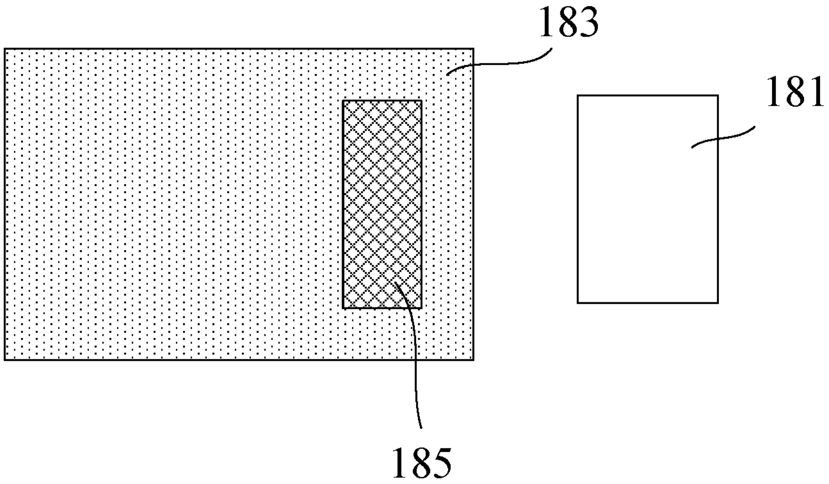

As shown in FIG. 4, illustration (a) in FIG. 4 is a schematic diagram of arrangement regions of various components of the current display device, and illustration (b) in FIG. 4 is a schematic diagram of arrangement regions of various components of the display panel of the present disclosure. As can be seen from illustration (a) in FIG. 4, a gate driving circuit arrangement region 212 and a stage transmission signal line arrangement region 213 need to be provided outside the display area 211, respectively, so that the bezel of the display device is large. As shown in illustration (b) of FIG. 4, it can be seen that there is overlapping portion between the stage transmission signal line arrangement region 185 and the gate driving circuit region 183, and the stage transmission signal line arrangement region 185 is located in the gate driving circuit region 183, thereby reducing the bezel of the display panel.

The embodiment of the present disclosure is described in detail by using the circuit diagram in FIG. 2 as an example. However, the embodiment of the present disclosure is not limited thereto. For example, a display panel using a 7T1C (seven transistors and one capacitor) circuit may be designed according to the present disclosure.

In an embodiment, in order to improve the flexibility of the display panel and the ability to block moisture and oxygen, as shown in FIG. 1, the substrate 11 includes a first flexible layer 111, a barrier layer 112, and a second flexible layer 113.

In an embodiment, as shown in FIG. 1, the display panel further includes a planarization layer 152.

In an embodiment, the material of the first semiconductor layer is low temperature polysilicon and the material of the active layer is an oxide, in particular indium gallium zinc oxide.

As shown in FIG. 1, the LTPO technology is used as an example to describe the structure of the display panel in the embodiment of the present disclosure. However, the embodiment of the present disclosure is not limited thereto. For example, the LTPS (Low Temperature Poly-silicon) technology may be used for the display panel.

Meanwhile, an embodiment of the present disclosure provides a display device including the display panel and the driving chip according to any one of the above embodiments.

It can be seen from the above embodiments that: an embodiment of the present disclosure provides a display panel and a display device; the display panel includes a display area and a non-display area disposed on at least one side of the display area, the display panel includes a substrate and a driving circuit layer, the driving circuit layer is disposed at a side of the substrate, the driving circuit layer includes multistage gate driving units disposed in the non-display area and stage transmission signal lines connecting gate driving units of different stages. The driving circuit layer includes a first semiconductor layer disposed at a side of the substrate, the first semiconductor layer includes a plurality of first semiconductors disposed in the non-display area, the gate driving unit includes the first semiconductor, and the stage transmission signal line is disposed between the first semiconductor layer and the substrate and is disposed to overlap with at least a portion of the gate driving unit in the non-display area. According to the present disclosure, by arranging the stage transmission signal line between the first semiconductor layer and the substrate, parasitic capacitance is prevented from being generated between the stage transmission signal line and the metal wires of the gate driving unit located above the first semiconductor layer. The stage transmission signal line may overlap with at least a part of the gate driving unit in the non-display area, so that a corresponding wiring region may be not additionally arranged for the stage transmission signal line, thereby reducing the space of the bezel occupied by the stage transmission signal line, and shortening the bezel of the display panel.

In the above-mentioned embodiments, the description of each embodiment has its own emphasis, and parts not described in detail in a certain embodiment may be referred to the related description of other embodiments.

The display panel and the display device according to an embodiment of the present disclosure has been described in detail. A specific example is used to illustrate the principles and embodiments of the present disclosure. The description of the above embodiments is merely provided to help understand the technical solution and the core idea of the present disclosure. It will be appreciated by those ordinary skilled in the art that modifications may still be made to the technical solutions described in the foregoing embodiments, or equivalents may be made to some of the technical features therein. These modifications or replacements do not cause the essence of the corresponding technical solutions to deviate from the scope of the technical solutions of the embodiments of the present disclosure.

What is claimed is:

1. A display panel comprising a display area and a non-display area disposed at at least one side of the display area, wherein the display panel further comprises:

a substrate; and a driving circuit layer disposed at a side of the substrate, the driving circuit layer comprising multistage gate driving units disposed in the non-display area and stage transmission signal lines connecting the gate driving units of different stages, and wherein the driving circuit layer comprises a first semiconductor layer disposed at the side of the substrate, the first semiconductor layer comprises a plurality of first semiconductors disposed in non-display regions, and the gate driving units comprise the first semiconductors; and the stage transmission signal line is disposed between the first semiconductor layer and the substrate, and is arranged to overlap with at least a portion of the gate driving unit in the non-display area;

wherein the driving circuit layer further comprises a first metal layer disposed at a side of the first semiconductor layer away from the substrate, the first metal layer comprises a gate disposed in the non-display region, and the gate driving unit comprises the gate; and the stage transmission signal line is arranged to overlap with at least a portion of the gate in the non-display area;

wherein the driving circuit layer further comprises a second metal layer disposed at a side of the first metal layer away from the substrate, the second metal layer comprises a metal wire disposed in the non-display area, and the gate driving unit comprises the metal wire; and the stage transmission signal line is arranged to overlap with at least a portion of the metal wire in the non-display area;

wherein the driving circuit layer further comprises a source-drain layer disposed at a side of the second metal layer away from the first metal layer, the gate driving unit comprises a transistor, the transistor comprises a first electrode and a second electrode disposed in the source-drain layer, and the first electrode passes through a first via hole and is connected to the stage transmission signal line.

2. The display panel according to claim 1, wherein the first electrode is connected to the first semiconductor through a second via hole, a width of the first via hole is greater than a width of the second via hole.

3. The display panel according to claim 1, wherein the display panel further comprises a connection metal, the first electrode is connected to the stage transmission signal line through the connection metal, and the connection metal passes through a via hole and is connected to the stage transmission signal line.

4. The display panel according to claim 1, wherein the display panel further comprises a light emitting layer disposed at a side of the driving circuit layer away from the substrate, the light emitting layer comprises a pixel light emitting unit disposed in the display area, the driving circuit layer further comprises a pixel driving unit disposed in the display area and driving the pixel light emitting unit, and a light shielding layer disposed between the pixel driving unit and the substrate, and wherein the light shielding layer comprises:

a light shielding portion disposed in the display area and overlapping with the pixel driving unit, and the stage transmission signal line disposed in the non-display area.

5. The display panel according to claim 4, wherein the first semiconductor layer further comprises a plurality of second semiconductors disposed in the display area, and the pixel driving unit comprises the second semiconductors;

the first semiconductor comprises a first channel region, and the stage transmission signal line does not overlap with the first channel region; and the second semiconductor comprises a second channel region, and the light shielding portion is arranged to overlap with the second channel region.

6. The display panel according to claim 5, wherein the driving circuit layer further comprises a second semiconductor layer disposed at a side of the first semiconductor layer away from the substrate, the second semiconductor layer comprises a plurality of third semiconductors disposed in the display area, the pixel driving unit further comprises the third semiconductors, and the third semiconductors comprise a metal oxide material; and the light shielding portion does not overlap with the third semiconductors.

7. The display panel according to claim 4, wherein the pixel driving unit comprises:

a first initialization transistor connected to a first initialization signal line, a gate of the first initialization transistor being connected to a first scanning signal line of a first gate driving unit, the first initialization transistor being configured to input a first initialization signal to a first node under control of a first scanning signal;

a switching transistor configured to input a data signal to a second node under control of a second scanning signal;

a driving transistor configured to drive the pixel light emitting unit to emit light under control of potentials of the first node and the second node; and a compensation transistor connected to the driving transistor through the first node and the third node, a gate of the compensation transistor being connected to a second scanning signal line of a second gate driving unit, the compensation transistor being configured to compensate a threshold voltage of the driving transistor under control of a third scanning signal; and wherein the gate driving unit comprises the first gate driving unit and the second gate driving unit of different stages, one end of the stage transmission signal line is connected to the first gate driving unit, and another end of the stage transmission signal line is connected to the second gate driving unit along a gate driving circuit region.

8. The display panel according to claim 7, wherein the gate driving unit further comprises a third gate driving unit, the gate driving circuit region comprises a first wiring region and a second wiring region, the first gate driving unit and the second gate driving unit are disposed in the first wiring region, the third gate driving unit is disposed in the second wiring region, and at least a portion of the stage transmission signal line is disposed in the second wiring region.

9. The display panel according to claim 8, wherein the first gate driving unit is connected to the stage transmission signal line through a via hole at a junction of the first wiring region and the second wiring region, and the second gate driving unit is connected to the stage transmission signal line through a via hole at the junction of the first wiring region and the second wiring region.

10. The display panel according to claim 8, wherein the display panel further comprises a connection wiring region disposed between the gate driving circuit region and the display area, the second wiring region is disposed between the first wiring region and the connection wiring region, and the stage transmission signal line extends from the second wiring region to the connection wiring region.

11. A display device comprising a display panel and a driving chip, the display panel comprising a display area and a non-display area disposed at at least one side of the display area, and the display panel further comprising:

a substrate; and a driving circuit layer disposed at a side of the substrate, the driving circuit layer comprising multistage gate driving units disposed in the non-display area and stage transmission signal lines connecting the gate driving units of different stages, and wherein the driving circuit layer comprises a first semiconductor layer disposed at the side of the substrate, the first semiconductor layer comprises a plurality of first semiconductors disposed in non-display regions, and the gate driving units comprise the first semiconductors; and the stage transmission signal line is disposed between the first semiconductor layer and the substrate, and is arranged to overlap with at least a portion of the gate driving unit in the non-display area;

wherein the driving circuit layer further comprises a first metal layer disposed at a side of the first semiconductor layer away from the substrate, the first metal layer comprises a gate disposed in the non-display region, and the gate driving unit comprises the gate; and the stage transmission signal line is arranged to overlap with at least a portion of the gate in the non-display area;

wherein the driving circuit layer further comprises a second metal layer disposed at a side of the first metal layer away from the substrate, the second metal layer comprises a metal wire disposed in the non-display area, and the gate driving unit comprises the metal wire; and the stage transmission signal line is arranged to overlap with at least a portion of the metal wire in the non-display area;

wherein the driving circuit layer further comprises a source-drain layer disposed at a side of the second metal layer away from the first metal layer, the gate driving unit comprises a transistor, the transistor comprises a first electrode and a second electrode disposed in the source-drain layer, and the first electrode is connected to the stage transmission signal line through a first via hole.

12. The display device according to claim 11, wherein the first electrode is connected to the first semiconductor through a second via hole, a width of the first via hole is greater than a width of the second via hole.

13. The display device according to claim 11, wherein the display panel further comprises a connection metal, the first electrode is connected to the stage transmission signal line through the connection metal, and the connection metal passes through a via hole and is connected to the stage transmission signal line.

14. The display device according to claim 11, wherein the display panel further comprises a light emitting layer disposed at a side of the driving circuit layer away from the substrate, the light emitting layer comprises a pixel light emitting unit disposed in the display area, the driving circuit layer further comprises a pixel driving unit disposed in the display area and driving the pixel light emitting unit, and a light shielding layer disposed between the pixel driving unit and the substrate, and wherein the light shielding layer comprises:

a light shielding portion disposed in the display area and overlapping with the pixel driving unit, and the stage transmission signal line disposed in the non-display area.

* * * * *